Figure 1:
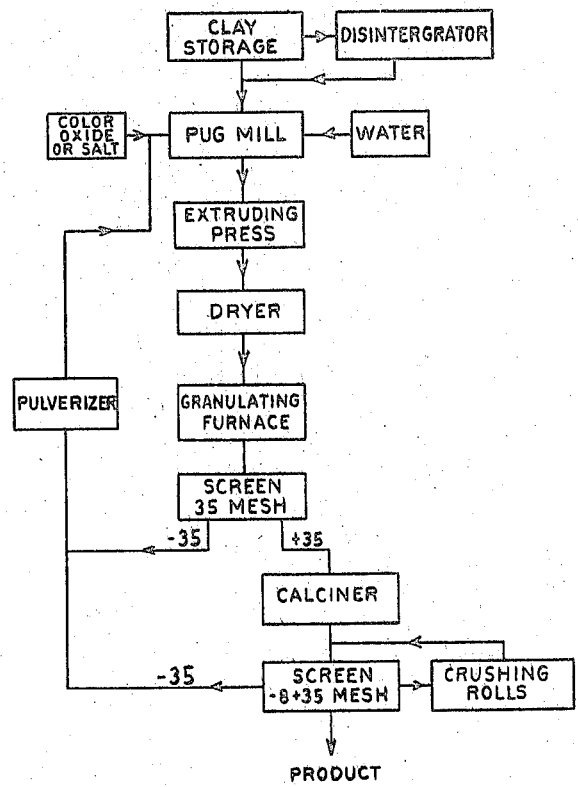

Aug. 1, 1933.                S. F. WALTON                 1,920,773
              GRANULE AND METHOD OF PRODUCING SAME
                 Filed July 3, 1930        2 Sheets-Sheet 1

SAMUEL F. WALTON
INVENTOR

BY  Samuel Stearman
ATTORNEY

Aug. 1, 1933. S. F. WALTON 1,920,773
GRANULE AND METHOD OF PRODUCING SAME
Filed July 3, 1930  2 Sheets-Sheet 2
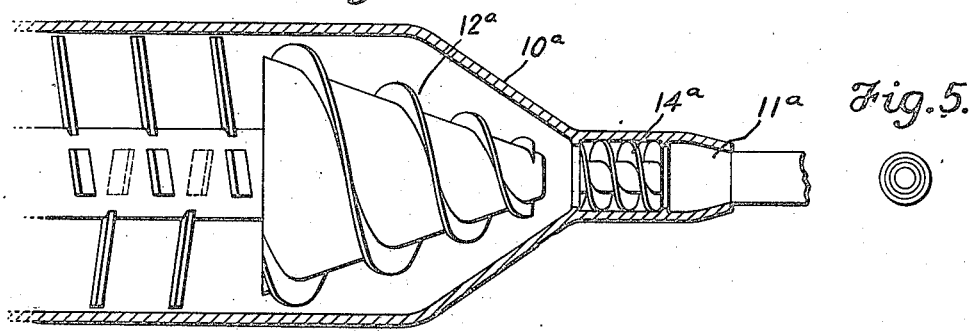
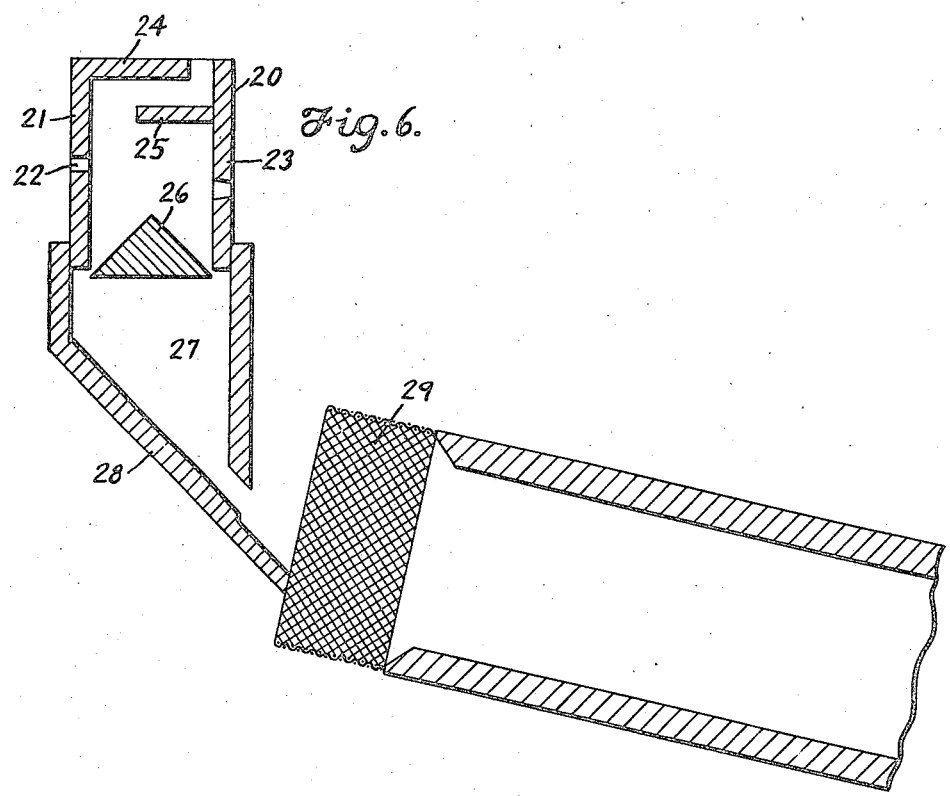
Samuel F. Walton
INVENTOR
BY Samuel Stearman
ATTORNEY Patented Aug. 1, 1933

1,920,773

UNITED STATES PATENT OFFICE 1,920,773

GRANULE AND METHOD OF PRODUCING SAME

Samuel F. Walton, Hamburg, N. Y., assignor, by mesne assignments, to The Patent and Licensing Corporation, New York, N. Y., a Corporation of Massachusetts Application July 3, 1930. Serial No. 465,528

11 Claims. (Cl. 25—156)

This invention relates to granules and methods of making the same, suitable for use as surfacing material for asphalt coated roofing or like purposes.

An object of my invention is to provide a continuous method for the production of granular material from plastic bodies consisting of clays or similar colloidal materials which can be formed with water into plastic bodies. Another object of my invention is to provide methods of producing granules of this character by a continuous system wherein coloring material may be employed for the production of granules of various colors and hues, which shall be permanently retained by the granules, the granules being of such a structure as to render them suitable for use as a surfacing material for asphalt coated roofing or the like.

It has heretofore been proposed to produce artificially colored granules for roofing purposes by impregnating crushed slate granules with salts decomposable under heat treatment, whereby to form coloring agents. It has also been proposed to color artificially, slate and similar granules by treating them with pigments and physical or chemical binding agents. It has also been proposed to crush soft laminated rocks, and natural clays and thereafter to vitrify the crushed material by heat treatment following which the vitrified granules are subjected to coloring treatment. The products produced according to these methods, however, are relatively expensive and in many instances do not permanently retain the color, especially where the coloring is applied as a film coating the surface of the granules, and in addition, these processes involve a rather accurate control of the operating conditions.

I have discovered that granules of the type referred to, can be produced from clays of plastic properties, in such a manner that the finished granules have a scale or flake-like formation which renders them most suitable for surfacing roofing material, and which are characterized by their susceptibility to permanent retention of coloring matter so that there is no danger of color loss when the material is subject to the action of the elements when used for roofing and similar purposes.

In carrying out my invention I take any suitable plastic clay and form a plastic mixture thereof with water, so as to render the mixture extrudable under pressure. This mixture is extruded in the form of bars of suitable length and cross-section, the extruding dies being provided with means arranged so that the bar as extruded will consist of a multitude of laminations of the plastic clay, separated from one another by microscopic spaces. These bars are then carefully dried to remove substantially all of the water, yet leaving a predetermined percentage of water for purposes as will hereinafter be more fully explained. The clay bars are then subjected to sudden heat which causes the steam formed from the retained water, and other gases, to be suddenly evolved with the result that the expansive force thereof causes disruption of the surface of the bars, whereby the clay gradually disintegrates from the laminations composing the bar to produce progressively small granules of scale or flake-like formation. The granulated materials produced in this way are then heated to a sufficiently high temperature until they reach the desired condition of hardness and vitrification.

For the purpose of illustrating my invention more clearly, reference may be had to the accompanying drawings, and the following more detailed description.

Figure 2:
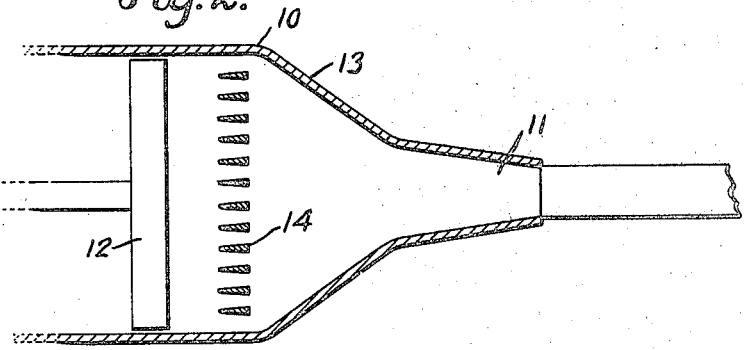
Figure 3:

In the drawings,

Figure 1 is a diagrammatic flow chart illustrating a practical embodiment of the invention, Figures 2 and 4 are sections through variant forms extruding devices that may be employed, Figures 3 and 5 represent in cross-section, clay bars formed by the extruding devices shown in Figures 2 and 4 respectively, and Figure 6 is a view in cross-section of apparatus employed in carrying out the process.

In operating the process according to the embodiment thereof typified in Figure 1, natural clay, or clay-like substances such as kaolin, ball clay, brick clay, shale or the like, is delivered from storage to a pug mill of any suitable and well known construction and mixed therein with suitable quantities of water of plasticity to make a uniform plastic mix. If the clay or other material employed is not of sufficient fineness, it may be passed through a disintegrator and ground to the desired fineness and then delivered to the pug mill. The quantities of water necessary to make a plastic mix will of course vary with the plastic qualities of the material employed, as is known in the art, but will, generally, range from say 5 to 25% by weight of the clay. Where kaolin is employed for example, about 15% of water will suffice to render it plastic.

The plastic mass is then transferred from the pug mill to the extruding device which may be of any well known construction but which, for the purposes of my invention, has associated therewith means for creating lamination of the extruded material, whereby the extruded bar will be of laminated cross-section. For this purpose, the laminating means are preferably interposed between the plunger or auger of the extruding machine and the die orifice thereof. In one form, as shown in Figure 2, the extruding device 10 may be constructed to extrude a bar of rectangular cross-section. Between the discharge orifice 11, and the plunger 12, and preferably adjacent the junction of the constricted mouth 13 with the main body of the extruder, are fixedly secured a series of spaced smooth or polished plates 14. As the plastic clay is forced past these plates, laminations are set up in the plastic body with the result that the clay bar as discharged from the extruder is composed of a series of laminae, as shown in cross-section in Figure 3.

In another embodiment, as shown in Figure 4, the extruding device 10a is constructed to extrude the material in the form of a bar of circular cross-section, and a revolving spiral smooth surface plate 14a is fixed within the mouth of the extruder intermediate the discharge orifice 11a thereof and the auger 12a. The clay bar as extruded by this mechanism will be of circular cross-section and as shown in Figure 5 will be formed with concentric laminae.

Where colored granules are desired and where the clay in its natural state does not contain the desired coloring matter, pigments in the form of oxides such as cobalt oxide, iron oxide, chromium oxide or the like, may be added to the clay mixture in the pug mill during the plastic conditioning thereof so as to be uniformly incorporated in the clay mix. Alternatively also, soluble salt may be incorporated in the clay-water mixture, which salts will decompose or react during the subsequent stages of the process to produce coloring agents. Obviously the proportion of the coloring matter incorporated in the clay mixture will depend upon the intensity of the color desired and upon the normal color of the clay when treated in accordance with the process in the absence of extraneous coloring agents.

Thus a rather intense blue color may be developed with from 2 to 5% by weight of smalt. Red colors, suitable for roofing purposes may be developed by incorporation of from 1 to 3% of iron oxide or the equivalent in iron containing salts, depending upon the natural oxide contained in the clay. Green colorations may be developed with chrome oxide in quantities ranging from 1 to 3% or the equivalent thereof in the form of potassium dichromate.

The clay bars as discharged from the extruding device, and consisting either of clay alone, as for example where white granules are desired, or clay admixed with coloring agents, are then passed through a drier or oven to remove the bulk of the contained water but to leave a definite amount of water therein.

From the drying oven the clay bars are fed continuously into a granulating furnace for effecting disintegration or disruption of the clay bars into granules of suitable size. This furnace may be in the form shown in Figure 6, as designated by the numeral 20. One of the side walls 21 of the furnace is apertured as at 22 for continuously feeding the dried clay bars into the furnace. This furnace may be indirectly heated or a burner may be fixed into the wall 23 thereof opposite the apertured wall 21, the burner projecting through an opening in the wall 23 and being arranged in such a manner that the flames will lick the forward advancing end of the clay bars. The top wall 24 of the furnace is preferably provided with an outlet for the removal of gases evolved within the chamber and dust that may be formed therein. The chamber is also provided with baffles 25 for regulating the direction of travel of the combustion gases therein, and also preferably with a false bottom 26 in the shape of a cone. The temperature maintained in this chamber will vary somewhat, depending upon the type of clay employed and the product desired but generally will range from 1000° to 2000° F.

As the clay bars are fed into this furnace the sudden heat to which they are subjected therein, effects a sudden evolution of steam from the water retained in the bar, and of other gases from combustible material that may be present, with the result that the expansive forces thereby set up below the surface of the bar structure, causes the bar to become surface shattered and gradually disintegrated in the form of flake or scale-like granules which fly or fall away from the main body of the bar in a shower of red hot granules. As the forward end of the bar is thus gradually shattered or disintegrated, the bar is progressively fed into the furnace until it is entirely consumed.

According to my process the shape and size of the granules produced in the manner aforesaid may be controlled within reasonably narrow limits by controlling the amount of residual water retained in the clay bars after drying, and before they are introduced into the granulating furnace. Thus, where the clay is of a character that forms a bar of considerable tensile strength, a substantially greater amount of water will need to be retained in the bars than is necessary in the case of clays which can be formed into bars of lower tensile strength. In general, however, a residual water content of from 1% to 8% will be required and the precise amount can readily be determined by the operator in carrying out the process with any particular clay, and in accordance with the shape and size of granules desired.

The granules as formed in the furnace 20, are preferably drawn continuously from the false bottom thereof through the pit 27 surmounted by the furnace. The granules then travel over the inclined wall 28, from which they feed directly over a screen 29, for the removal of undesired fines. Where granules for roofing purposes are being made, they may vary in size from such as will pass an 8 mesh screen to such as will be retained on a 35 mesh screen. In such case the screen 29, may be 35 mesh and any fines passing through the screen may be collected in a suitable receptacle. It is an advantage of my process that undesired fines may thus be reclaimed and returned to the initial stage of the process to be mixed with fresh quantities of clay, water and coloring ingredients, in the pug mill. The undesired fines thus removed, may if desired, or necessary, first be passed through a pulverizer before returning them to the pug mill. The screened granules are then subjected to a final calcining treatment, preferably in a rotary kiln, or other types of calciners known in the art, maintained at a temperature, and under atmospheric conditions such as will create the desired final hardness and color effect. Generally the temperatures maintained in the kiln will vary from about 2000° to 2800° F.

Where granules of more or less vitrified surface texture are desired, this may be accomplished by suitably regulating the temperature conditions in the kiln, depending upon the nature of the clay. Likewise the vitrification temperature may be lowered by incorporating in the plastic mixture, from which the clay bars are formed, suitable fluxing agents such as metallic borates, alkalis, alkaline earth oxides, or the like. When granules of vitrified surface texture are being produced, the agitating effect of the rotary kiln will preclude agglomeration and fusing together of the granules during the final stages of treatment in the kiln, for the production of the desired degree of hardness and color. The granules as discharged from the calciner may again be screened to remove material of undesired size. For example, where the granules for roofing purposes are being produced, fines of less than 35 mesh may be removed and returned if desired to the pug mill either directly or after being pulverized. Oversized material discharged from the calciner and screened out, may be crushed between rolls and again passed through the final screening operation.

While I have indicated that I prefer to remove the granules from the granulating furnace in which the clay bars are disrupted and treat them in a rotary kiln to bring about the final degree of hardness and color, it will be understood that the clay granules as produced in the heating chamber from the preformed clay bars, may be accumulated in this furnace until they have reached the desired state of hardness and color under the temperature conditions prevailing in this chamber. Also, if desired, the coloring materials may be incorporated in the granules after formation in the manner described, instead of in the plastic clay mixture. In this case the granules may be impregnated with coloring salt solutions, which will be transformed into coloring pigments under the subsequent heat treatment in the rotary kiln, or the granules may be mixed with pigments carried in aqueous suspension containing soluble fluxes such as sodium borate, sodium silicate or the like, so that during the subsequent heat treatment, the desired color will be developed.

I claim as my invention:

1. The process of producing granules suitable for roofing purposes or the like which comprises extruding a bar of plastic clay-like material of laminated structure, subjecting said bar to sudden heat whereby to set up expansive forces within the bar, effective to cause surface disruption of the bar into granular particles.

2. The process of producing granules suitable for roofing purposes or the like which comprises extruding a bar of plastic clay-like material of laminated structure, subjecting said bar to sudden heat whereby to set up expansive forces within the bar, effective to cause surface disruption of the bar into granular particles, and subsequently heating the granular particles to produce desired hardness and vitrification.

3. The process of producing colored granules suitable for roofing purposes which comprises admixing clay with coloring matter for forming a plastic mixture thereof, extruding a laminated bar of the plastic mixture, subjecting said bar to sudden heat whereby to set up expansive forces within the bar, effective to cause surface disruption of the bar into granular particles.

4. The process of producing colored granules suitable for roofing purposes which comprises admixing clay with coloring matter for forming a plastic mixture thereof, extruding a laminated bar of the plastic mixture, subjecting said bar to sudden heat whereby to set up expansive forces within the bar, effective to cause surface disruption of the bar into granular particles, and subsequently heating the granular particles to produce desired hardness and vitrification and to develop the desired color.

5. The process of producing granules suitable for use in the manufacture of roofing, which comprises extruding a laminated bar of plastic clay-like material, drying said bar to remove the bulk of the water contained therein but to leave a predetermined residual water content, subjecting said bar to sudden heat whereby to cause the residual water suddenly to expand and cause surface disruption of the bar into granular particles of scale or flake-like formation.

6. The process which comprises admixing a plastic clay with water and coloring matter and making a plastic mixture thereof, extruding the plastic material in a bar of laminated structure, drying said bar whereby to remove the bulk of the water contained therein but to leave a residual excess, subjecting said bar to sudden heat whereby to cause the residual water suddenly to expand and cause surface disruption of the bar into granular particles of scale or flake-like formation, and subsequently heating the granules to produce the desired hardness and vitrification and develop the final color.

7. Granules suitable for use in the manufacture of roofing consisting of clay particles of flake or scale-like formation.

8. Granules suitable for use in the manufacture of roofing consisting of clay particles of flake or scale-like formation, and colored with pigment homogeneously distributed through the entire structure of the granules.

9. A process of the character described comprising plasticizing clay, laminating the plasticized clay, subjecting the laminæ to sufficient heat to cause disruption thereof, thereby forming granules of scale or flake-like formation.

10. A process of the character described comprising plasticizing clay by the addition of water, laminating the plasticized clay, heating the laminæ to drive out the major portion of the water, subjecting the partially dried laminæ to sufficient heat to cause disruption thereof, thereby forming granular particles of scale or flake-like formation.

11. A process of the character described comprising plasticizing clay by the addition of water, laminating the plasticized clay, heating the laminæ to drive out the major portion of the water, subjecting the partially dried laminæ to sufficient heat to cause disruption thereof to form granular particles of scale or flake-like formation and subsequently heating the granules to produce the desired hardness and vitrification.

SAMUEL F. WALTON.